L. P. BENSON.
ADJUSTABLE ATTACHMENT FOR RECEPTACLES.
APPLICATION FILED DEC. 18, 1908.
928,841.
Patented July 20, 1909.
2 SHEETS—SHEET 2.
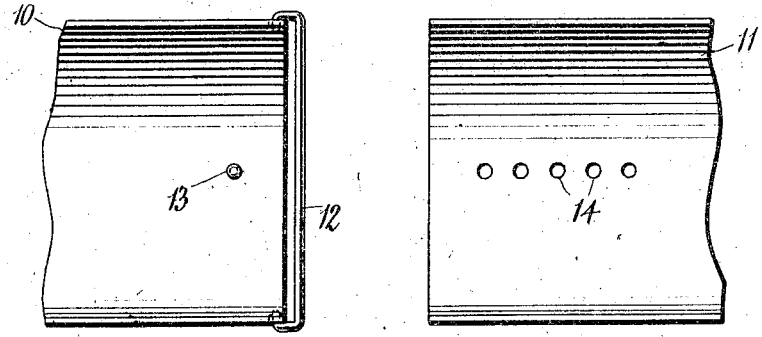
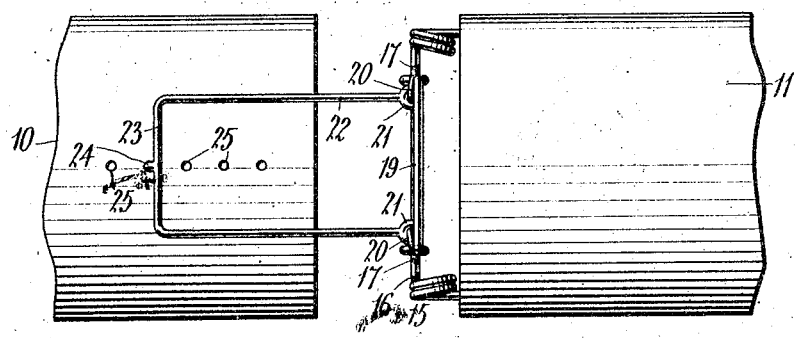
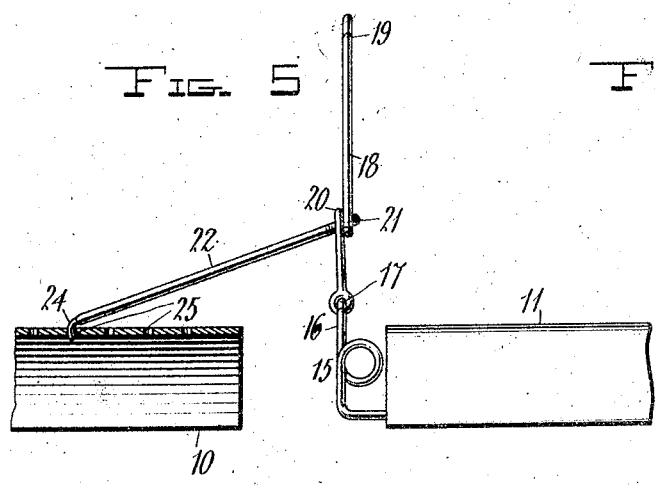
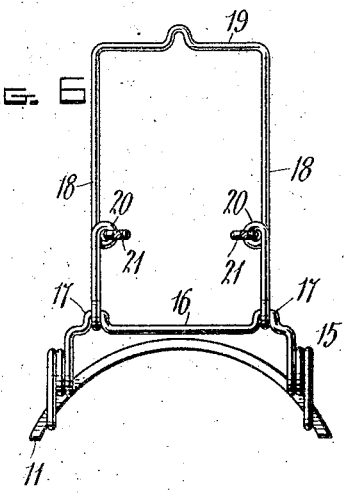
Inventor
Lenus P. Benson
Witnesses
By
Attorneys

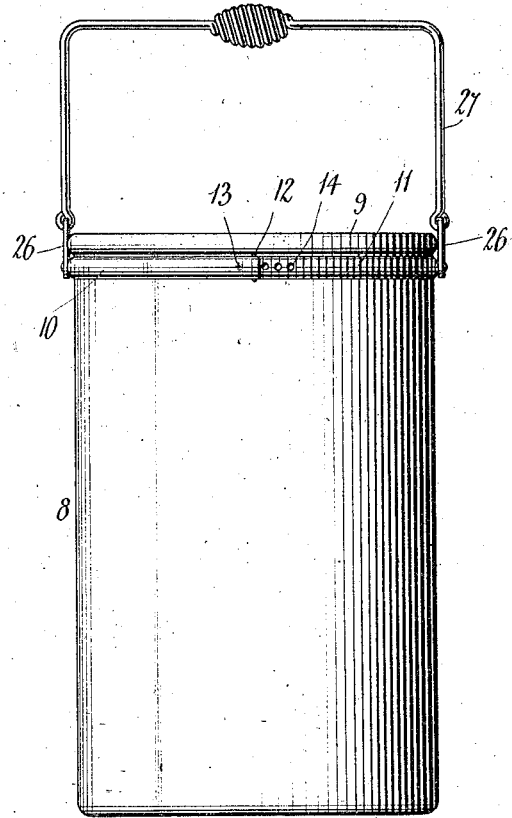
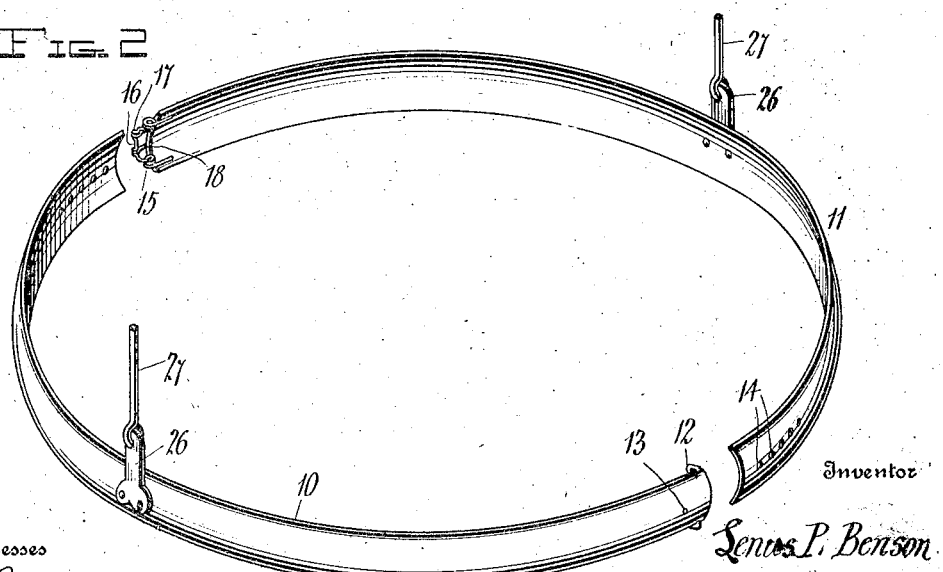

UNITED STATES PATENT OFFICE.

LENUS P. BENSON, OF KARLSTAD, MINNESOTA.

ADJUSTABLE ATTACHMENT FOR RECEPTACLES.

No. 928,841.    Specification of Letters Patent.    Patented July 20, 1909.

Application filed December 18, 1908. Serial No. 468,254.

*To all whom it may concern:*

Be it known that I, LENUS P. BENSON, a citizen of the United States, residing at Karlstad, in the county of Kittson, State of Minnesota, have invented certain new and useful Improvements in Adjustable Attachments for Receptacles; and I do hereby declare the following to be a full, clear, and exact description of the invention, such as will enable others skilled in the art to which it appertains to make and use the same.

The invention relates to adjustable attachments for receptacles and more particularly to the class of adjustable bail rings for stone jars or the like.

The primary object of the invention is the provision of an adjustable attachment for jars or the like comprising a pair of members adapted to be mounted about the body of a jar, and means for clamping the said members in proper position on the jar.

Another object of the invention is the provision of an adjustable bail ring for jars or the like in which means is provided for permitting the bail ring to be applied to jars of varying sizes, and means for clamping the said ring securely about the body of the jar whereby the said jar can be raised and transported from one locality to another by the bail or handle thereof.

With these and other objects in view the invention consists in the construction, combination and arrangement of parts as will be hereinafter more fully described, illustrated in the accompanying drawings which disclose the preferred form of embodiment of the invention and as brought out in the appended claims.

It is to be understood that minor changes, variations and modifications may be resorted to such as come properly within the scope of the appended claims without departing from the spirit of the invention.

In the drawings: Figure 1 is a side elevation of a jar with the invention applied thereto. Fig. 2 is a perspective view with the bail ring in assembled position. Fig. 3 is a fragmentary plan view of the adjustable ends of the members forming the bail ring and the same being disconnected. Fig. 4 is a fragmentary plan view of the opposite ends of the members showing the clamp means in a position about to lock the ends together. Fig. 5 is a side elevation thereof, partly in section. Fig. 6 is a detail end view of one member with the clamping means in elevation and partly in section.

Similar reference characters indicate corresponding parts throughout the several views in the drawings.

In the drawings, the numeral 8 designates the body of the jar or other vessel having formed exteriorly thereof at its mouth portion an annular rib 9, which jar is of the usual or ordinary construction. Fitted about the jar 8 immediately below the rib 9 is a bail ring member or attachment comprising semi-annular sections 10 and 11 each of which is of semi-circular contour in cross section and at one end of the section 10 is formed a loop 12 which receives the adjacent end of the section 11 and a slight distance removed from the said loop and projecting from the inner face of the section 10 is a lug 13 which latter is adapted to enter any one of a series of openings 14 contained in the adjacent end of the section 11 so as to adjustably secure the said adjacent ends of the sections together. At the opposite end of the section 11 are formed spaced eyes 15, the same bent from a wire forming a yieldable bridge piece 16 the free ends of which are secured to the section 11 and which bridge piece has formed therein offset portions 17 to which latter are hinged the lower ends or inner extremities of the legs 18 of an inverted U-shaped yoke member 19.

Formed on the legs 18 a considerable distance removed from their hinged connection with the bridge piece 16 are eyes 20 to which are hinged as at 21 the extremities of a catch member in the form of a U-shaped yoke 22 the latter having formed on its cross piece 23 a hook or bill 24 the same adapted to be brought into engagement with any one of a series of openings 25 contained in the end of the section 10 so that when the yoke member 19 is swung inwardly in contact with the section 11 the catch member will securely clamp the sections about the body of the jar.

Secured at points intermediate the ends of the sections 10 and 11 respectively, and arranged at diametrically opposite localities are perforated ears 26 to which is flexibly connected a bail member or handle 27 to permit the jar to be readily handled and transported from one locality to another.

It is obvious that by the adjustable connections of the ends of the sections 10 and 11 the latter are capable of being fitted about the bodies of various sized jars or receptacles. Also when the sections are disposed about a jar the same can be securely clamped thereto.

What is claimed is—

1. An attachment of the class described comprising a pair of semi-annular members, each of said members containing a series of openings at one end thereof, and means on the opposite ends of the members adapted to adjustably engage the openings to clamp the said members about the body of a receptacle.

2. An attachment of the class described comprising semi-annular sections each containing at one end thereof a series of openings, a loop formed on one section to freely receive the adjacent end of the other section, a lug on one section and adapted to engage one of the openings in the other section to adjustably connect the sections together, clamp catch means carried by one of the sections and adapted to engage the openings in the adjacent end of the other section to adjustably connect the adjacent remaining ends of the sections, and a bail connected to the sections.

In testimony whereof, I affix my signature, in presence of two witnesses.

LENUS P. BENSON.

Witnesses:
C. W. FITHEEN,
PAULENE STENWICK.